Feb. 10, 1970　　D. F. HUFFHINES　　3,494,443
TOWBOAT SYSTEM FOR HANDLING ACOUSTIC SOURCE IN
MARINE SEISMIC OPERATIONS
Filed Feb. 29, 1968　　　　　　　　　　8 Sheets-Sheet 1

INVENTOR
DONALD F. HUFFHINES

Arthur F. Zobel
ATTORNEY

INVENTOR
DONALD F. HUFFHINES

ATTORNEY

INVENTOR
DONALD F. HUFFHINES

Arthur F. Zobal
ATTORNEY

INVENTOR
DONALD F. HUFFHINES

ATTORNEY

Feb. 10, 1970  D. F. HUFFHINES  3,494,443
TOWBOAT SYSTEM FOR HANDLING ACOUSTIC SOURCE IN
MARINE SEISMIC OPERATIONS
Filed Feb. 29, 1968  8 Sheets-Sheet 7

INVENTOR
DONALD F. HUFFHINES

Arthur J. Zobal
ATTORNEY

FIG. 14

INVENTOR
DONALD F. HUFFHINES

Arthur F. Zobel
ATTORNEY

United States Patent Office 3,494,443
Patented Feb. 10, 1970

3,494,443
TOWBOAT SYSTEM FOR HANDLING ACOUSTIC SOURCE IN MARINE SEISMIC OPERATIONS
Donald F. Huffhines, Richardson, Tex., assignor to Mobil Oil Corporation, a corporation of New York
Filed Feb. 29, 1968, Ser. No. 709,397
Int. Cl. G10k 11/00; G01v 1/00
U.S. Cl. 181—.5                    7 Claims

ABSTRACT OF THE DISCLOSURE

The specification discloses a traveling carriage supporting a plurality of winches and a boom for handling a pneumatic acoustic source on a towboat in marine seismic operations. At the far end of the boom there is coupled a cradle which is employed for cradling the source when it is being lifted and raised from and into the water to prevent the source from swinging sideways. A large-diametered reel is mounted on the carriage for reeling in and out a fluid- and power-supply hose which extends to the pneumatic source. Air and other fluids are supplied to the hose through the reel. The winches are controlled by a hydraulic system driven from a common supply whereby all of the winches and the reel may be driven simultaneously to reel the cables and the hose concomitantly during raising and lowering operations.

BACKGROUND OF THE INVENTION

This invention relates to a system for handling a marine acoustic source on a towboat.

In United States patent applications Ser. No. 534,130, filed Mar. 14, 1966, now Patent No. 3,397,755, by George B. Loper, and Ser. No. 663,676, filed Aug. 28, 1967, by Bernard Otto, both of which are assigned to the same assignee as that of the present invention, there is disclosed a repetitive pneumatic acoustic source for marine seismic operations. The source comprises a rigid chamber having an outlet port which is opened and closed by a fast-acting, spool-shaped valve. In operation, the valve is moved to close the port, and the chamber is pressurized with high gas pressure. The valve then is actuated to open the port rapidly to allow the pressurized gas to be released rapidly from the outlet port to generate an acoustic pulse in water.

The source mentioned above, in one embodiment, has a large chamber capable of holding a large amount of gas for the production of high energy acoustic pulses in water. Its weight is of the order of 1800 pounds. The chamber is pressurized by injecting compressed air and diesel fuel in the chamber for forming a combustible mixture which is ignited by a plurality of glow plugs. In addition, low pressure air is supplied to a retract chamber employed for retracting the valve to its closed position following the generation of an acoustic pulse. Lubricating fuel is supplied to the source as well as electrical power for energizing the glow plugs, for triggering the valve, and for monitoring the chamber pressure. Thus, a number of conduits are required for operating the source. In addition to the above, there is required a cable for supporting the source in the water as well as a secondary safety cable.

In view of the number of supply conduits and cables, and in view of the large mass of the source itself, difficulties were experienced initially in handling the source on the towboat and in raising and lowering it from and into the water.

In accordance with the present invention, there is provided a novel system which has proved to be successful in handling the source and which has advantages in that it is economic, compact, and easy to operate. The system of the present invention comprises a carriage means supported toward and away from a towing position on the towboat. Cable reel means is mounted on the carriage for reeling in first and second directions the cable coupled to the source used for support and towing purposes. Also provided is a boom having a first end coupled to the carriage and a second end supported to extend over the edge of the boat when the carriage is moved to the towing position. A reel is coupled to the second end of the boom for supporting the cable whereby the seismic source is supported at a position above the water when the carriage is located at the towing position. In addition, reel means is mounted on the carriage for reeling the fluid conduits in the first and second directions when the source is lowered into the water and reeled therefrom respectively. Power means is provided for raising and lowering the second end of the boom to facilitate the lowering and lifting of the source into and from the water. Thus, as can be understood, the handling system is compact in that the boom as well as the cable and fluid conduit reels are all mounted on the single carriage.

In a further aspect, there is provided means coupled to the second end of the boom for cradling the source when the source is pulled adjacent the boom to prevent the source from swinging sideways. Tracks coupled to the deck of the boat are employed for supporting the carriage in its movement toward and away from the towing position. With this arrangement, the carriage may be moved away from the stern of the boat, thereby facilitating storage and repair of the source when not in use. When it is desired to operate the source for seismic operations, the carriage with the source may be moved to the stern to lower the source into the water.

In a further aspect, the electrical and fluid conduits have one end coupled to the source and a second end coupled to the perimeter of the conduit reel means. These conduits extend through the rim of the reel and the fluid conduits additionally extend through the axle of the reel for supplying operating fluid to the source during operation. Thus, this arrangement has advantages in that it avoids the need to make or break connections during movement of the source on the carriage or during the lifting or raising operations.

In the embodiment disclosed, the system for driving the reels comprises a fluid-drive means having a common hydraulic fluid conduit extending thereto for supplying driving fluid to the driving reels to allow the reels to be driven simultaneously whereby the cable and the fluid conduits may be reeled concomitantly during the reeling operations. This arrangement has advantages in that it reduces the possibility of the cables and conduits being broken or torn during reeling operations.

DESCRIPTION OF THE PREFERRED EMBODIMENTS

Figure 1:
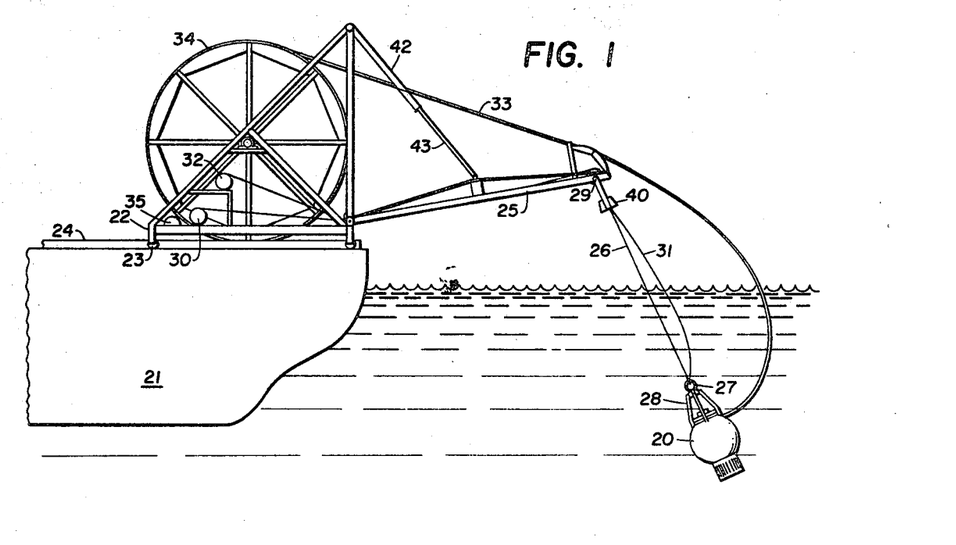
FIGURES 1, 2, 4, and 5 illustrate the seismic source handling system at different positions on the towboat.

Referring now to FIGURE 1, the source-handling system of the present invention is shown supporting an acoustic source 20 in water from a towboat 21. The handling system comprises a traveling carriage 22 which is supported by wheels 23 for movement along a track 24 secured to the deck of the boat. In FIGURE 1, the carriage is shown at the stern of the boat in a towing position whereby the source 20 may be towed in the water behind the boat and operated periodically to produce acoustic pulses in water for seismic surveying purposes. Pivotally mounted on the carriage 22 is a boom 25 which is shown lowered to a position slightly above the horizontal during towing operations. The source 20 is supported from the end of the boom 25 by way of a cable 26 which is coupled to the source by way of eye 27 and four supporting arms 28. This cable extends over reel assembly 29 and is wound and unwound by winch 30, also mounted upon the carriage 22. Cable 31 is a safety cable which is coupled to the source and also extends over reel assembly 29 to a second winch 32 mounted on the carriage 22. The conduits which supply fluid and power to the source for its operation are located in a hose assembly illustrated at 33. This hose has one end coupled to the source 20 and a second end coupled to a large reel 34 mounted on the carriage 22. Reel 34, upon which the hose 33 is wound and unwound, is driven by a winch 35 also mounted on carriage 22. Thus, all of the cable and conduit reeling mechanisms are located on the single carriage 22, thereby simplifying the operations and providing a compact handling assembly.

After shooting operations have terminated and it is desired to bring the source 20 in, winches 30, 32, and 35 are operated simultaneously from a common hydraulic supply whereby cables 26 and 31 and hose 33 are reeled in concomitantly. This arrangement also facilitates operations and reduces the chance of the conduits or hoses being broken or torn during reeling operations.

Figure 2:
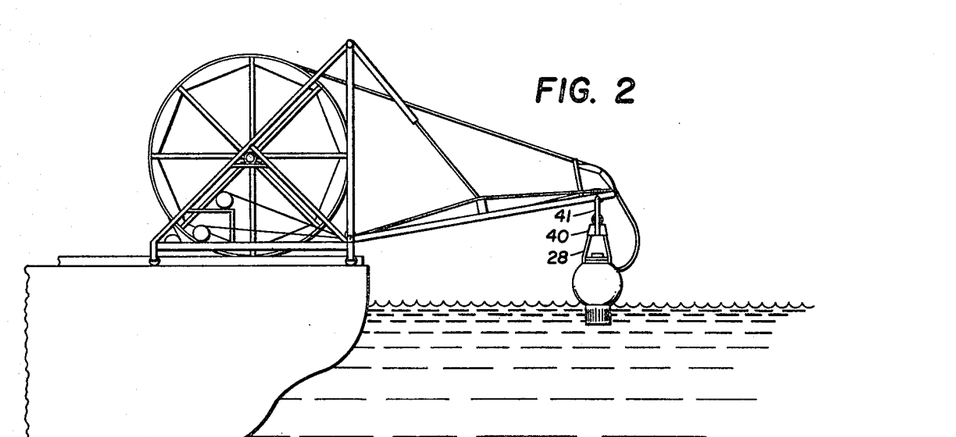
Figure 3:
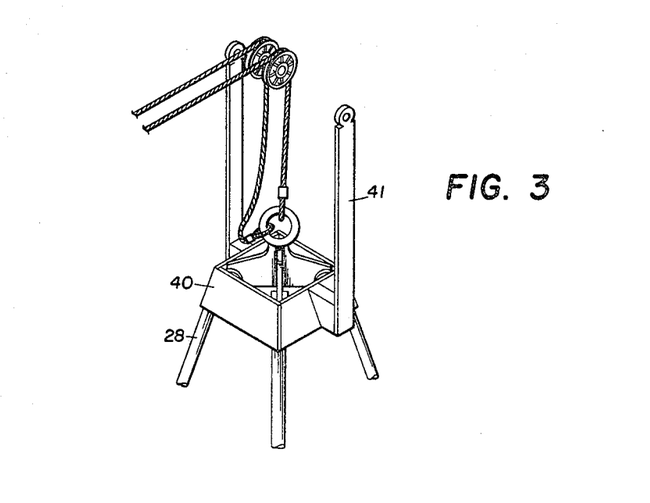
FIGURE 3 is an enlarged illustration showing in detail the semismic source cradling system.
Figure 4:
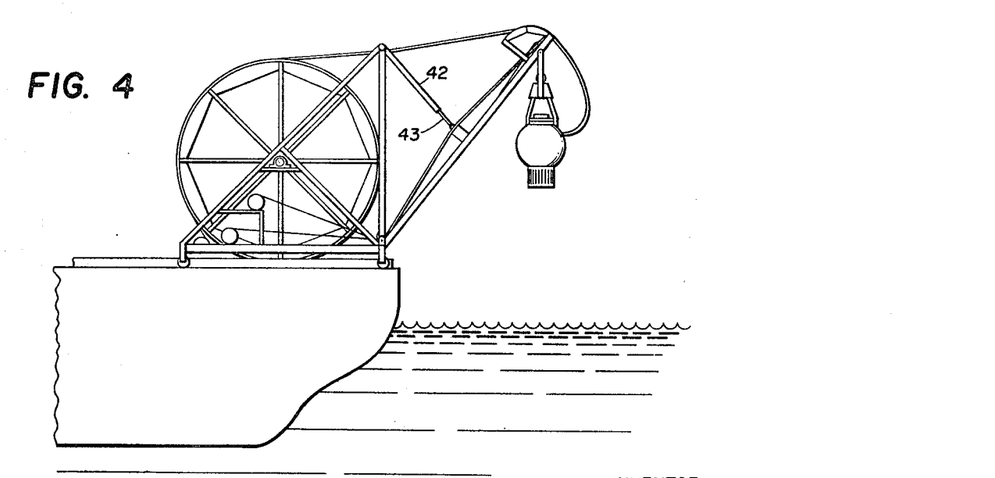
Figure 5:
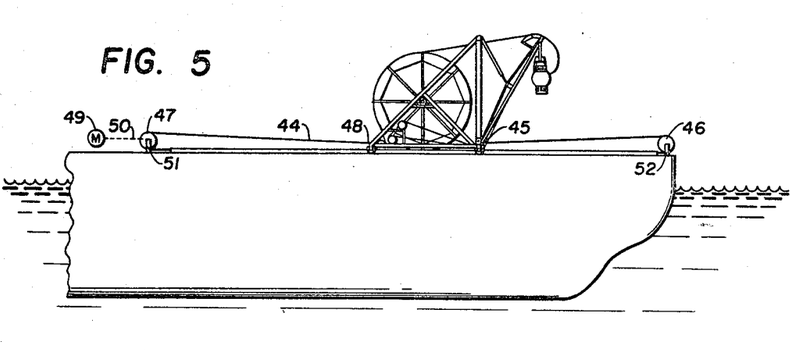

When cables 26 and 31 and hose 33 are reeled in, the four supporting arms 28 of the source 20 become cradled in cradle 40 as illustrated in FIGURES 2 and 3. As can be seen in these figures, cradle 40 is a hollow, truncated, pyramidal-shaped member whose interior corners snuggly receive the four supporting arms 28 of the source. Arms 41 pivotally couple the cradle 40 to the boom 25 for motion only about a horizontal axis transverse to the length of the boom, thereby preventing the source from swinging sideways when cradled. This is desirable in order to prevent the source from pulling the carriage over on its side. After the arms 28 and hence the source 20 become cradled, the boom 25 then is lifted by hydraulic cylinders 42 and rods 43 to a position as shown in FIGURE 4. The carriage assembly including the source 20 then is moved away from the stern of the boat to a storage or repair position as shown in FIGURE 5.

All of the fluid conduits which are incorporated in the hose 33 extend from the hose 33 to their respective supplies by way of the rim and the axle of the reel 34. With this arrangement, no fluid connections need be made or broken in the handling operations described above.

The system for moving the traveling carriage comprises a cable 44 (FIGURE 5) which has one end coupled to the rear of the carriage at 45. The cable then extends around reel 46 along the floor or deck of the boat toward the middle thereof and around reel 47 and is coupled to the front end of the carriage 22 at position 48. Reel 47 and hence cable 44 are driven by an electric, reversible motor 49, and belt 50 to move the carriage to its storage or towing position. Although not shown in detail, reels 46 and 47 are rotatably coupled to members 51 and 52, respectively, which in turn are rigidly secured to the deck of the boat.

Figures 6, 7:
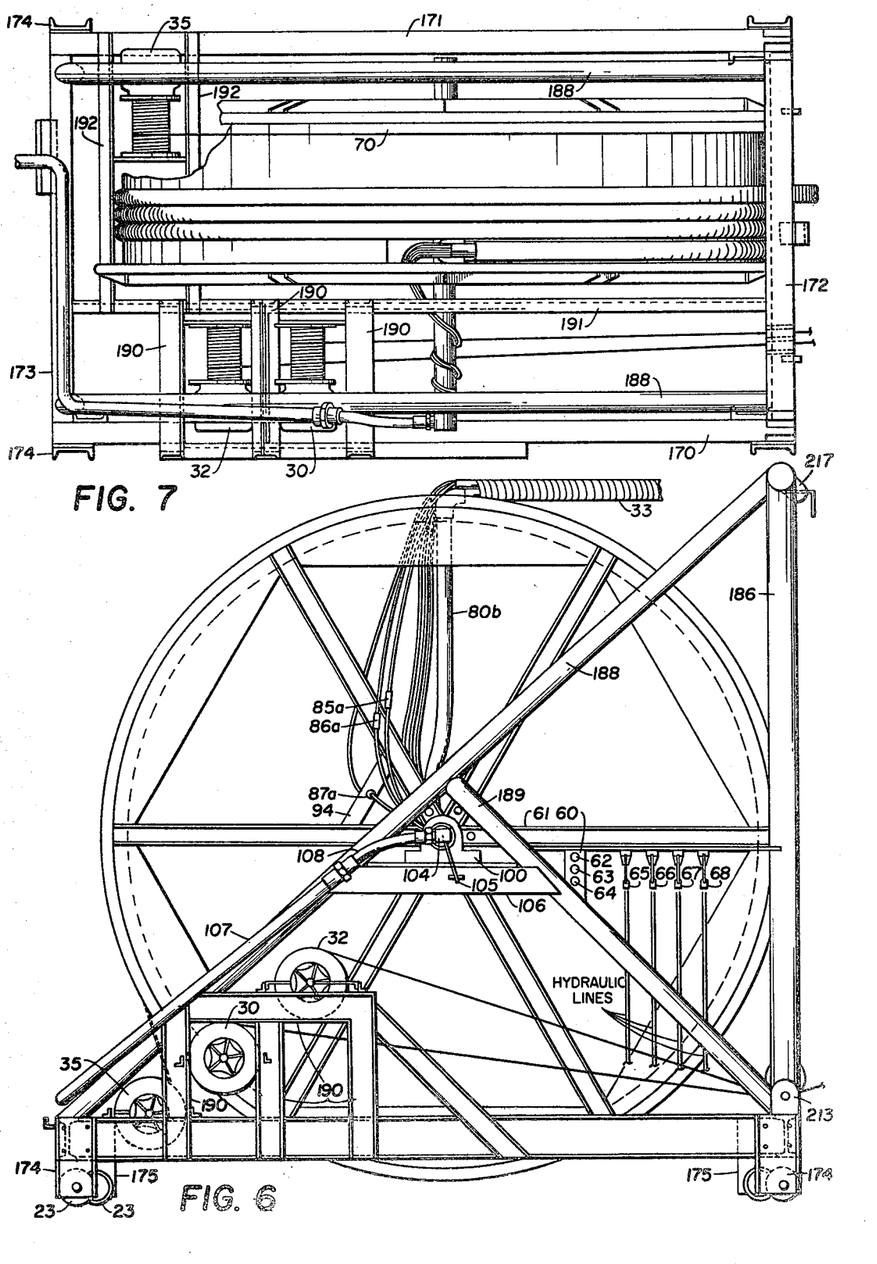
FIGURES 6 and 7 are enlarged side and top views, respectively, of the carriage system for handling the seismic source.

For ease of operation, the controls of motor 49 and of winches 30, 32, and 35 are located on the carriage itself. As can be seen in FIGURE 6, the controls for motor 49 consist of a switch box 60 supported from member 61 and having a stop button 62, a forward button 63, and a reverse button 64. The winches 34, 32, and 35 are hydraulically operated and are controled by levers 65–67, respectively, also supported from member 61. Lever 68 is employed to control the boom 25.

Referring to FIGURE 7, it can be seen that winches 30 and 32 are located on one side of the carriage, while winch 35 is located on the other side thereof. Cable 70 has one end coupled to winch 35 and the other end coupled to reel 34 for control purposes. When the boom 25 is in its raised position (FIGURE 4), the cable 70 extends from winch 35 and is wrapped partially around reel 34, at one side thereof, to position 71 where it is coupled to the reel 34 (see FIGURE 8). In addition, the hose 33 is wrapped around the other side of the reel 34 about three turns as seen in FIGURE 7. In this same position, cables 26 and 31 will be fully wound around winches 30 and 32, as also seen in FIGURE 7. When it is desired to lower the source, lever 68 is actuated to allow the weight of the source to pull the boom 25 down. Actuation of levers 65–67 will allow cables 26 and 31 and hose 33 to unwind from winches 30 and 32 and reel 34. As the hose 33 unwinds from reel 34, the cable 70 is unwound from winch 35 onto reel 34. When the hose 33 is fully extended, about four turns of cable 70 will be wound upon reel 34. When it is desired to reel the source in, actuation of levers 65–67 causes winches 30, 32, and 35 to be driven in an opposite direction whereby the cables 26, 31, and 70 will be wound around their respective winches. As cable 70 is wound around winch 35, it is unwound from reel 34, while hose 33 is wound around reel 34.

Figures 9, 13, 15:
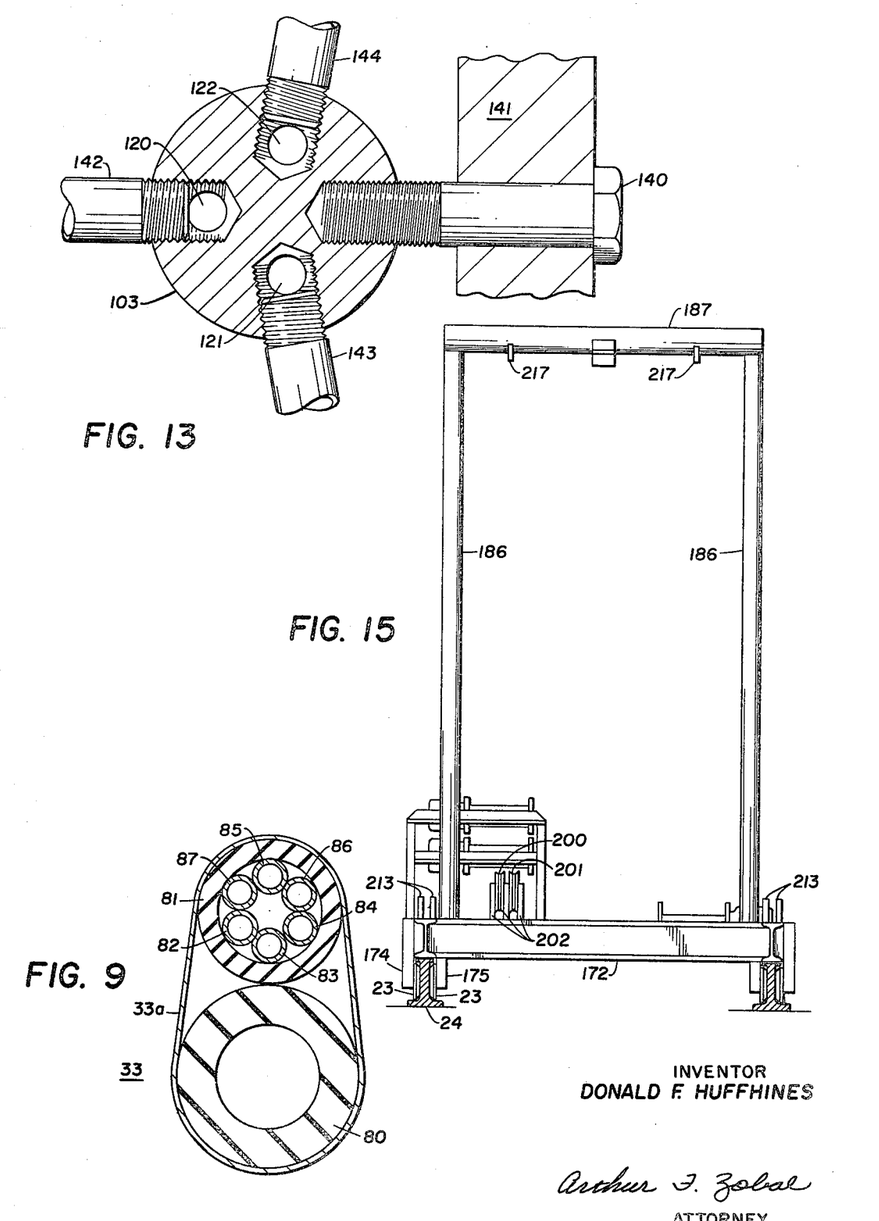
FIGURE 9 is a cross section of the hose assembly used for supplying power and fluid to the seismic source.
FIGURE 13 is a cross section of FIGURE 12 taken along lines 13—13 thereof.
FIGURE 15 is an enlarged end view of the carriage assembly of FIGURE 6 without the large reel located therein.

Referring to FIGURE 9, it can be seen that the hose 33 comprises a main air hose 80 and an auxiliary hose 81 which are coupled together by binding tape 33a. The main air hose 80 has an inside diameter of about two inches and an outside diameter of three and one-half inches and is employed to supply the high pressure air to the combustion chamber of the seismic source. It is formed of rubber with about five layers of steel braid and hence is a relatively stiff hose. It is positioned adjacent the rim of the reel 34 to minimize the stretching of the hose 80 as it is wound and unwound from reel 34 and as the hose assembly 33 assumes the arc position shown in FIGURE 1 during towing. The hose 81 is a stretchable hose formed of rubber and rests on top of hose 80 whereby it will be exterior of hose 80 when wound upon reel 34 and when the hose assembly 33 forms the arc position shown in FIGURE 1. Positioned within hose 81 are a number of conduits for supplying additional fluid and power for operating the source. For example, conduit 82 supplies low pressure air for retracting the valve of the source to its closed position following the generation of an acoustic pulse; conduit 83 supplies lubricating fluid for lubricating the valve assembly of the source; and conduit 84 supplies diesel fuel which is mixed with the air from hose 80 in the main chamber of the source to form a combustible mixture which is ignited and burned to pressurize the main chamber. Conduits 85 and 86 carry the high voltage and return leads for energizing the electric glow plugs in the chamber for igniting the combustible mixture therein, while conduit 87 carries a number of other electrical leads for controlling or actuating the valve of the source, for monitoring the pressure within the chamber, etc. Although shown symmetrically located within the hose 81, all of the conduits 82–87 are free to slide within hose 81, thereby minimizing breakage during handling operations.

Figures 8, 10:
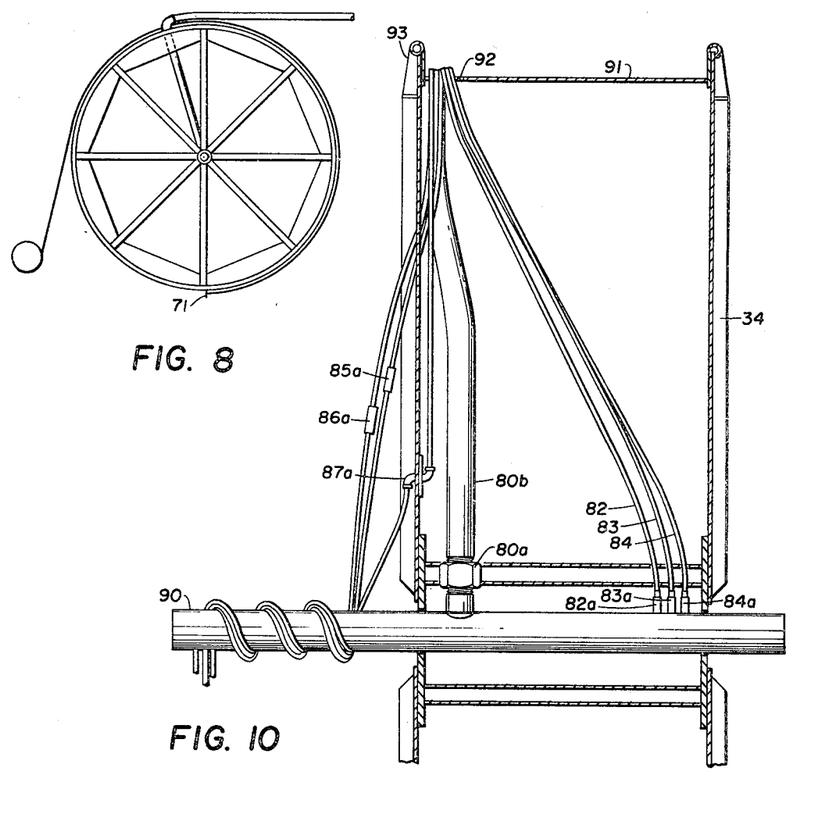
FIGURE 8 illustrates the manner in which the control cable is coupled to the large reel of the carriage system.
FIGURE 10 is an enlarged cross-sectional view of FIGURE 6 taken through the upper portion of the reel and looking toward the front end thereof which is to the left of FIGURE 6.
Figure 11:
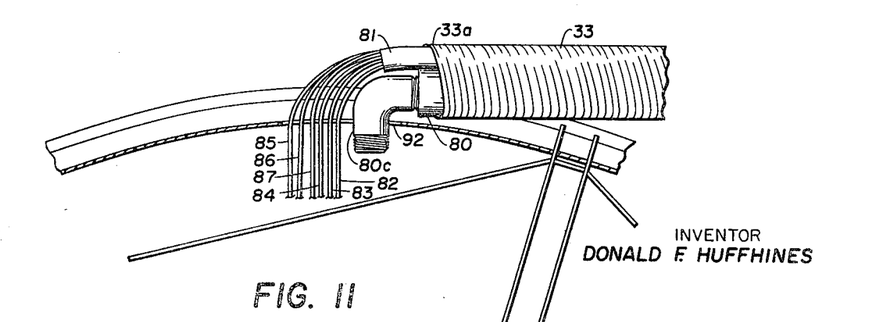
FIGURE 11 is an enlargement of the top portion of the reel of FIGURE 6 illustrating the manner in which the hose assembly extends through the rim of the reel.

Referring to FIGURES 10 and 11, the fluids for hose 80 and conduits 82–84 are supplied thereto by way of rotating joints located in axle 90 of the reel 34. This axle is rigidly coupled to the reel and rotates therewith. Fluids for conduits 82–84 are supplied through the axle 90 from one end thereof. These conduits are coupled to the axle 90 by way of metal coupling members 82a–84a and extend from the coupling members to the top of the rim 91 of the reel 34. Air for hose 80 is supplied through the other end of the axle 90. This air flows from axle 90 to hose 80 by way of coupling member 80a, hose connection 80b, and elbow 80c, the latter of which is shown in FIGURE 11. This elbow, as well as conduits 82–84, extends through the rim 91 by way of slot 92. Elbow 80c is rigidly coupled to flange 93 by way of clamps (not shown). The hose 80 in turn is rigidly coupled to the portion of the elbow 80c extending through the slot 92. At this point, tape or binding material 33a is wrapped around hose 80 as well as auxiliarly hose 81. As can be seen in FIGURE 11, conduits 82–84 extend from hose 81 at its end thereof and then directly through the slot 92 to their respective coupling members 82a–84a. As the reel 34 rotates, axle 90 rotates as well as the portions of the conduits 82–84 within the reel 34 as well as hose connection 80b.

The electrical conduits 85–87 extend from the hose 81 and through slot 92 of rim 91, but are loosely wrapped around axle 90 in such a manner that as the reel 34 is rotated to wind hose 33, these conduits will be wound around the axle and when the reel 34 is rotated in an opposite direction to unwind the hose 34, these conduits will be unwound from the axle 90. As can be seen in FIGURES 6 and 10, electrical connectors 85a–87a are provided for connecting or disconnecting these leads at the reel 34, if found to be desirable. Electrical connector 87a is secured to member 94, while connectors 85a and 86a hang free.

Figure 12:
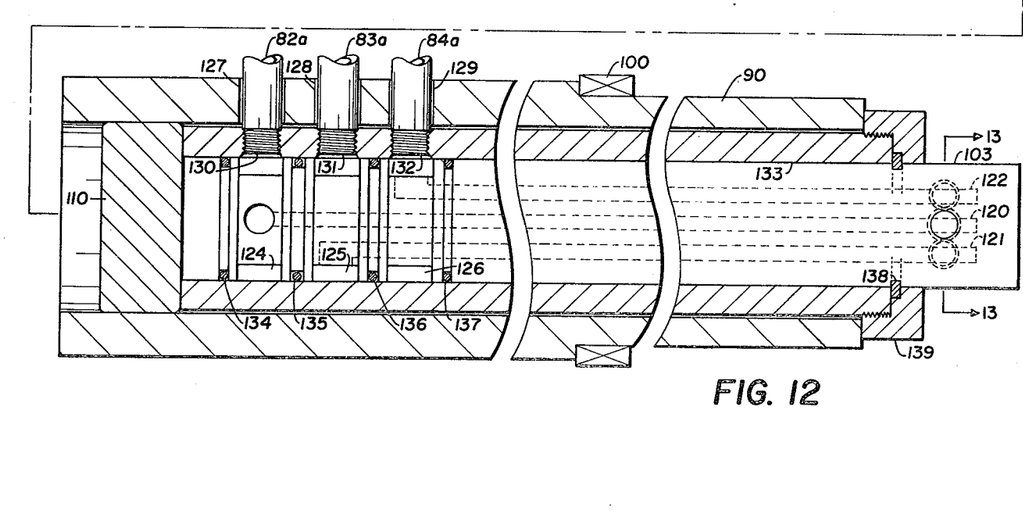
FIGURE 12 illustrates the arrangement for supplying fluid through the rotating axle of the reel of FIGURE 6.

Referring now to FIGURE 12, there will be described in detail the rotating joints in axle 90 for supplying fluid to the hose 80 and to conduits 82–84. The axle 90 is supported for rotation by bearing members 100 also shown in FIGURE 6. One end of the axle 90 has a stationary core 102 through which air for hose 80 is supplied, while the other end of axle 90 has another stationary core 103 through which fluid for conduits 82–84 is supplied. Core 102 extends partially into the axle 90 and has a coupling member 104 rigidly threaded to its end extending out of the axle 90. The coupling member 104 and hence the core 102 are held stationary by pin 105 coupled to the connecting member 104 and to plate 106 rigidly coupled to the carriage support members (see FIGURE 6). Air is supplied to the core 102 by way of pipe 107, flexible conduit 108, and coupling 104. It then flows into the axle 90, to coupling 80a, and then to hose 80 by way of hose connection 80b and elbow 80c. Plug 110 prevents the air from flowing to the other end of the axle. Seals 111 are supported in member 112 to block the flow of air from between core 102, member 112, and axle 90. Set screws 113 couple the member 112 to axle 90 for rotation therewith, while retaining ring 114 prevents core 102 from sliding axially with respect to axle 90. This ring is supported between coupling member 112, axle 90, and in a circumferential slot formed in core 102.

At the other end of the axle 90, fluid is supplied to coupling members 82a–84a by way of apertures 120–122 which extend axially into core 103 to circumferential slots 124–126, respectively, formed in core member 103. Metal coupling members 82a–84a extend through apertures 127–129 formed in axle 90 and are threaded into apertures 130–132 formed in secondary sleeve 133. As can be seen, these apertures 130–132 formed in secondary sleeve 133. As can be seen, these apertures 130–132 extend over the slots 124–126, respectively, whereby fluid from apertures 120–122 will pass to the appropriate connectors 82a–84a. Seals 134–137 block the flow of fluid between core 103 and secondary sleeve 133. Retaining ring 138 prevents core 103 from sliding axially with respect to secondary sleeve 133. This ring is supported between sleeve 133, coupling member 139, and in a circumferential slot formed in core 103. Metal coupling members 82a–84a cause sleeve 133 to rotate with axle 90 but prevent sleeve 133 from sliding axially with respect to axle 90.

In operation of the system, axle 90, secondary sleeve 133, and coupling member 139 rotate as indicated above. Core 103 is held stationary by a pin 140 which extends through carriage member 141 and also radially into core 103 as seen in FIGURE 13. Fluid is supplied to the axial apertures 120–122 by way of connectors 142–144 as seen in FIGURE 13 also. On board ship, fluid is supplied to connectors 142–144 by way of flexible conduits 145–147, while air is supplied to pipe 107 and conduit 108 by way of flexible conduit 148 as seen in the schematic illustration of FIGURE 14.

Figure 14:
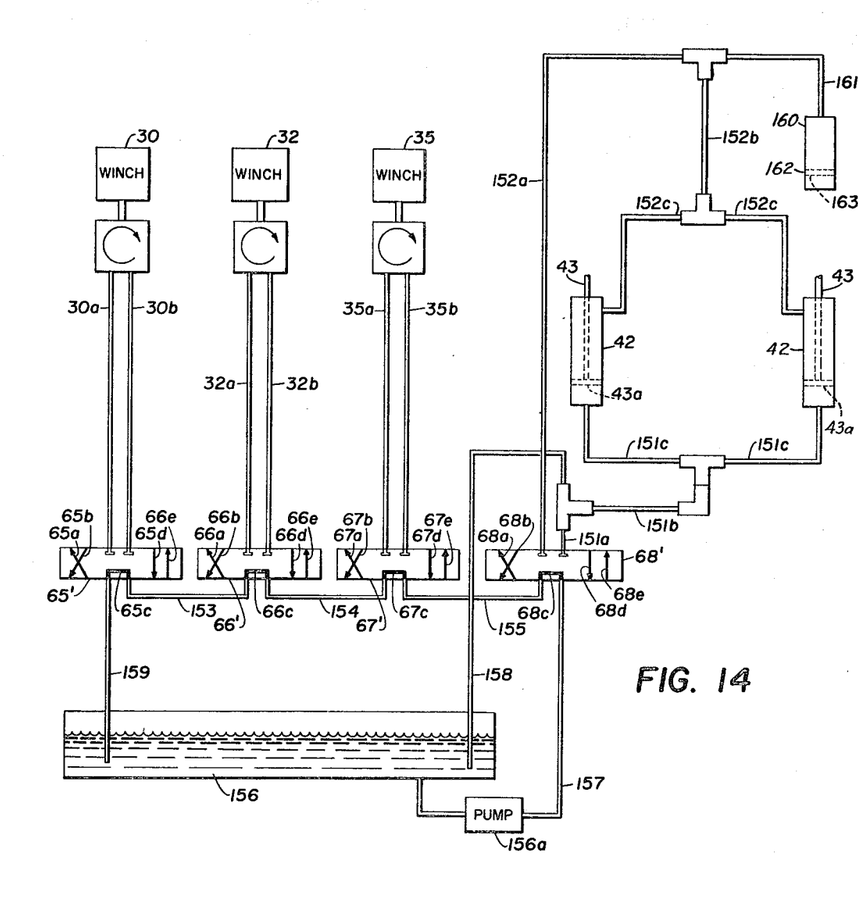
FIGURE 14 is a schematic illustration of the hydraulic controls for the seismic source handling system and, in addition, is a schematic illustration of the system of FIGURE 12.

FIGURE 14 also schematically illustrates the hydraulic system for controlling the three winches 30, 32, and 35 as well as the boom 25. The levers 65–68 (see FIGURE 6) control valves illustrated in FIGURE 14 as 65'–68', respectively, for controlling the flow of hydraulic fluid to the winches 30, 32, and 35, and to the hydraulic cylinders 42 employed for controlling the boom 25. Each valve has separate fluid flow passageways illustrated at 65a–65e, 66a–66e, 67a–67e, and 68a–68e. Each of the winches 30, 32, and 35 has two fluid flow conduits 30a–30b, 32a–32b, and 35a–35b leading to the valves 65', 66', and 67'. In addition, the cylinders 42 have conduits 151a–151c extending from the valve 68' to one side of their pistons 43a and conduits 152a–152c extending from the valve 68' to the other sides of their pistons 43a. Extending between the valves 65'–68' are conduits 153–155. Fluid is supplied from reservoir 156 to the valve assembly by way of pump 156a and conduit 157. Conduits 158 and 159 are used for drain purposes.

Valves 65'–68' are biased normally to the positions shown. In these positions, hydraulic fluid may flow through passages 68c, 67c, 66c, and 65c from conduits 157, 155, 154, and 153, respectively. The valves may be moved individually to the far right or far left to connect passages 65a–65b, 66a–66b, 67a–67b, 68a–68b or passages 65d–65e, 66d–66e, 67d–67e, 68d–68e, respectively, with the conduits associated with the valves. When the valves 65'–68' are released, they will return to their normal positions.

The sequence of operation of the hydraulic system now will be described assuming that the carriage 22 is at the storage position and that the boom 25 has been lowered to position the source 20 on the deck. The source is cradled and the hose assembly 33 has been let out an amount sufficient to allow the boom to be raised or lowered without placing undue tension on the hose assembly 33. Raising or lowering of the boom 25 places little or no additional tension on cables 26 or 31 since they in effect pivot about a reel assembly at the rear of the carriage 22 substantially in line with the pivot point of boom 25. The boom is raised to lift the source by moving valve 68' momentarily to the far right position. This allows hydraulic fluid to flow from conduit 157 through passage 68a to conduits 152a–152c to push the pistons 43a and rods 43 into their cylinders 42, thereby lifting the boom 25 and putting slack in hose assembly 33. Forward button 63 of switch 60 (FIGURE 6) is pushed to drive motor 49 in a direction to move the carriage 22 to the stern of the boat. The motor 49 then is stopped by pushing stop button 62, and the boom 25 is lowered by momentarily moving valve 68' to the far left. This allows fluid from conduit 157 to flow through passage 68e into drain conduit 158 and also allows fluid from conduits 152a–152c to flow through passage 68d whereby it may pass to drain conduit 159. The weight of the source itself will pull the boom 25 down. As the boom 25 is lowered, the slack in hose assembly 33 is taken out. After the boom 25 has been lowered, valves 65'–67' substantially simultaneously are moved to the far right to drive the three winches 30, 32, and 35 simultaneously in the direction of the arrows to allow the cables 26, 31, and 70 to unwind therefrom. The flow of fluid from reservoir 156 is by way of pump 156a, conduit 157, passage 68c, conduit 155, passage 67a, and conduit 35a to winch 35. From winch 35, fluid flows through conduit 35b, passage 67b, conduit 154, passage 66a, and conduit 32a to winch 32. Fluid flow proceeds through conduit 32b, passage 66b, conduit 153, passage 65a, conduit 30a, winch 30, conduit 30b, passage 65b, and drain 159 to reservoir 156. Thus, fluid from reservoir 156 simultaneously drives the winches whereby they may be unreeled at the same speed. This reduces the possibility of breakage to the cables 26 and 31 or hose assembly 33 as they are pulled down by the weight of the source 25. Once the source is down in the water at the appropriate depth, valve 65' is allowed to return to its normal position. Valves 66' and 67', however, are held to the right for a slightly longer period to allow the safety cable 31 and hose 33 to unwind further to obtain the desired amount of slack in these lines. About six feet of slack is allowed to form in safety cable 31, while about fifteen to twenty feet of slack is allowed to form in hose assembly 33. The boom 25 then is raised to its desired shooting position about 15° from the horizontal by moving valve 68' to the far right position.

During shooting operations, the source will recoil upward, thereby putting slack in the cable 26. This slack however is momentarily taken up by the use of a gas accumulator 160 which is coupled to conduits 152a–152c by conduit 161. Located within the accumulator 160 is a piston 162 which has high pressure gas on the side identified at 163. As the load becomes less on the boom 25 due to recoil, the high pressure gas acts upon piston 162 to push hydraulic fluid back into the cylinders 42, thereby momentarily raising the boom to take up the slack due to recoil. The cylinders 42 and hence the gas accumulator 160 thus are used as lifting devices and as shock absorbers.

After shooting operations have terminated and it is desired to bring the source in, the valve 66' is moved to the far left to drive winch 32 in a direction to take up some of the slack in the safety cable 31. After the slack is taken up, valves 65'–67' simultaneously are all moved to the far left position to reel in the three cables 26, 31, and 70 and hence the hose 33 at the same speed. The winches 30, 32, and 35 are driven in a direction opposite that of the arrows. The flow of fluid from reservoir 156 is by way of pump 156a, conduit 157, passage 68c, conduit 155, passage 67e, and conduit 35b to winch 35. From winch 35, fluid flows through conduit 35a, passage 67d, conduit 154, passage 66e, and conduit 32b to winch 32. Fluid then flows through conduit 32a, passage 66d, conduit 153, passage 65e, conduit 30b, winch 30, conduit 30a, passage 65d, and drain 159 to reservoir 156.

The cables 26 and 31 and hose 33 are reeled in until the source becomes cradled. The source is lifted to the position of FIGURE 4 by momentarily moving valve 68' to the far right position. Then the reverse button 64 of switch 60 is actuated to drive the motor 49 in a direction to move the carriage to the storage or repair position.

Referring again to FIGURES 6 and 7 and to FIGURE 15, there will be described in more detail the carriage assembly. The traveling carriage is shown constructed of a rectangular base formed from I-beams 170–173 welded together. Vertical wheel supports 174 are welded to the external sides of I-beams 170 and 171, while vertical wheel supports 175 are welded to the interior sides of these I-beams. Wheels 23 are coupled to the interior sides of supports 174 and to the exterior sides of supports 175 whereby they ride within the C-shaped portion of each track 24 which also is an I-beam.

At the front of the carriage, two vertical steel posts 186 have their lower ends welded to the I-beam 172 and their upper ends welded to a horizontal post 187. Two diagonal posts 188 have their upper ends welded to horizontal post 187 and their lower ends welded to I-beam 173. An additional supporting member 189 is welded to diagonal post 188 and to the apex between I-beam 170 and vertical post 186. A similar arrangement is provided on the other side of the carriage. In addition, on each side of the carriage a plate 106 is welded to one of the members 189 and to one of the diagonal posts 188. Each plate 106 supports a bearing member 100. Winches 30 and 32 are supported by a frame made up of members 190 which are welded together and to I-beam 170 and member 191. Winch 35 is supported by members 192 which are welded to member 191 and I-beam 171.

As can be seen in FIGURE 15, two reels 200 and 201 supported between posts 202 coupled to I-beam 172 are employed to guide and support the cables 26 and 31 at the rear of the carriage 22.

Figure 16:
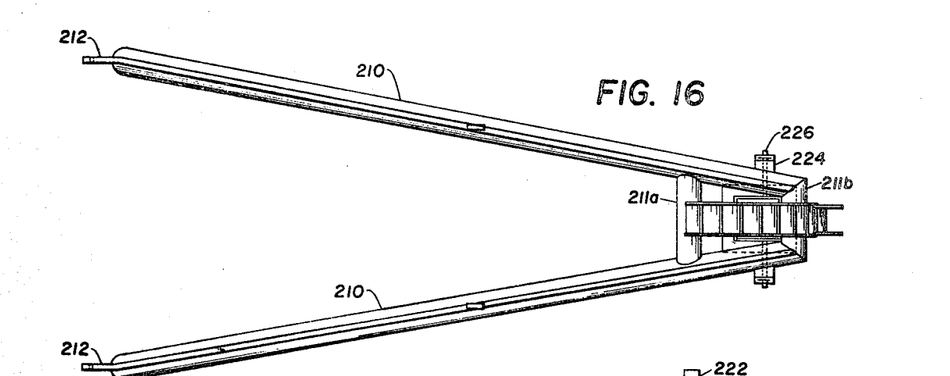
FIGURES 16–18 illustrate in detail the boom coupled to the carriage for handling the seismic source.
Figures 17, 18:
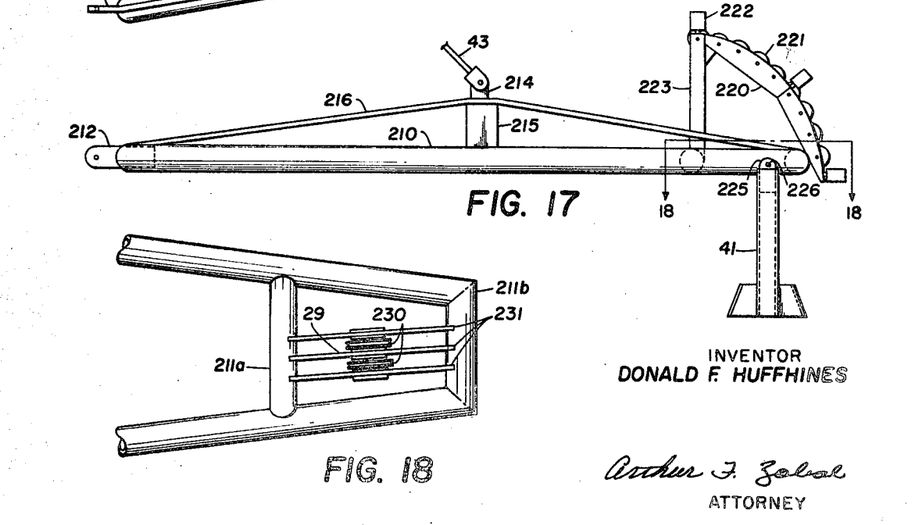

Referring to FIGURES 16 and 17, the boom 25 is made up of two metal posts 210 having their far ends coupled together by crossposts 211a and 211b and their pivotal ends coupled to support members 212. These latter members are pivotally coupled to vertical members 213 (see FIGURES 6 and 15). The lower portions of reels 200 and 201 are substantially in line with the pivot point through members 213 to minimize tension on cables 26 and 31 as the boom 25 is raised and lowered. Piston rods 43 are pivotally coupled to studs 214 welded to support members 215 and 216 which in turn are welded to posts 210. The cylinders 42 in turn are pivotally coupled to members 217 (see FIGURES 6 and 15) which are welded to horizontal post 187.

An arrangement is provided for guiding the hose assembly 33 and which comprises arc-shaped members 220 supporting horizontal rollers 221 and side rollers 222. Members 220 are secured to crosspost 211b and to crosspost 211a by way of vertical post 223.

As can be seen in FIGURES 16 and 17, arms 41 for supporting the cradle 40 are pivotally coupled to metal posts 210 in a manner to prevent the cradle 40 and hence the source 20 from swinging sideways. Horizontally extending studs 224 are welded to posts 210 for supporting the arms 41. These arms in turn are welded to extensions 225 which are pivotally coupled to studs 224 by way of pivot members 226.

Referring to FIGURE 18, it can be seen that the reel assembly 29 for supporting and guiding the cables 26 and 31 comprises two pulleys 230 rotatably coupled between three posts 231 which in turn are coupled to crossposts 211a and 211b.

In the embodiment of the present invention, the large reel 34 has a diameter of about eight feet. Hose assembly 33 is about eighty feet long. During towing operations while the source 20 is being fired, it is located and towed in water about forty feet below the surface.

What is claimed is:

1. A system for supporting and handling a marine seismic source adapted to be towed in water by a towboat, comprising:
   support means supported for movement toward and away from a towing position on said towboat,
   a tow cable coupled to said source,
   first reel means mounted on said support means for reeling said cable in first and second directions for lowering and raising said source into and from the water, a boom having a first end coupled to said support means and a second end supported to extend over the edge of said boat when said support means is moved to said towing position, means coupled to said second end of said boom for supporting said cable at said second end of said boom whereby said source is supported at a position over the water when said support means is located at said towing position, second reel means mounted on said support means, a hose assembly coupled to said source and to the perimeter of said second reel means, said second reel means being employed for reeling said hose assembly in first and second directions when said source is lowered into the water and raised therefrom, said hose assembly including at least one main air conduit for supplying pressurized air to said source for pressurizing said chamber and at least one other conduit for supplying fluid to said source, an axle coupled to said second reel means for rotation therewith, first and second conduit means extending from the perimeter of said second reel means, to the axle thereof and supported for rotation therewith, said first and second conduit means providing separate flow passages, respectively, from said axle to said main air conduit and to said other conduit, a first stationary member extending axially into said axle from one end thereof, a second stationary member extending axially into said axle from the other end thereof, each of said members having at least one aperture extending axially into said members, means for applying pressurized air to said aperture in said first member, means for applying fluid to said aperture in said second member, and first and second coupling means for coupling said apertures in said first and second members, respectively, to said first and second conduit means for allowing air and fluid to flow to said first and second conduit means, respectively, for passage to said air conduit and to said other conduit for flow to said source.

2. The system of claim 1 wherein said hose assembly comprises:

said main air conduit, a secondary conduit, means for coupling said main air conduit and said secondary conduit together to prevent movement therebetween, and a plurality of smaller conduits coupled to said source and extending through said secondary conduit, said plurality of smaller conduits being free to slide with respect to each other to minimize breakage thereof when said hose assembly is wound and unwound upon and from said second reel means.

3. A system for supporting and handling a marine seismic source adapted to be towed in water by a towboat, said source having a tow cable and at least one fluid conduit connected thereto, comprising:

first reel means for reeling in first and second directions said cable coupled to said source for towing purposes, second reel means for reeling in first and second directions said conduit coupled to said source, support means, a boom having a first end coupled to said support means and a second end supported to extend away from said support means, means coupled to said second end of said boom for supporting said cable and said conduit for movement when reeled in said first and second directions, first fluid-drive means for driving said first reel means, second fluid-drive means for driving said second reel means, and a common supply coupled to said first and second drive means for supplying driving fluid to said first and second drive means to allow said first and second reel means to be driven simultaneously to allow said cable and said conduit to be moved concomitantly in the same direction.

4. The system of claim 3 comprising:

a hydraulic system for raising and lowering said boom, and means for applying fluid from said common supply to said hydraulic system for controlling the position of said boom.

5. The system of claim 4 comprising:

a gas accumulator including a cylinder with a piston located therein, one side of said cylinder being coupled to fluid from said hydraulic system and the other side having high pressure gas between said piston and said cylinder walls whereby said high pressure gas applies pressure to said piston to force fluid back into said hydraulic system to raise said boom momentarily if it recoils upward upon the generation of an acoustic pulse.

6. A system for supporting and handling a marine seismic source adapted to be towed in water by a towboat, said source having a tow cable and at least one fluid conduit connected thereto, comprising:

carriage means supported for movement toward and away from a towing position on said towboat, first reel means mounted on said carriage means for reeling in first and second directions said cable coupled to said source, second reel means mounted on said carriage means for reeling in first and second directions said fluid conduit coupled to said source, a boom having a first end coupled to said carriage and a second end supported to extend over the edge of said towboat when said carriage is moved to said towing position, means coupled to said second end of said boom for supporting said cable and said fluid conduit at said second end of said boom whereby said source is supported at a position over the water when said carriage is located at said towing position, and common power means coupled to said first and second reel means for driving said first and second reel means to allow said first and second reel means to allow said first and second reel means to be driven simultaneously to allow said cable and said fluid conduit to be moved concomitantly in the same direction.

7. In a marine seismic surveying system, the combination comprising:

a towboat, carriage means supported for movement toward and away from a towing position and said towboat, a seismic source, a tow cable coupled to said source, at least one fluid conduit coupled to said source, first reel means mounted on said carriage means for reeling in first and second directions said cable coupled to said source, second reel means mounted on said carriage means for reeling in first and second directions said fluid conduit coupled to said source, a boom having a first end coupled to said carriage and a second end supported to extend over the edge of said towboat when said carriage is moved to said towing position, means coupled to said second end of said boom for supporting said cable and said fluid conduit at said second end of said boom whereby said source is supported at a position over the water when said carriage is located at said towing position, means for lowering and raising said second end of said boom to facilitate the lowering and lifting of said source into and from the water, means coupled to said second end of said boom for cradling said source when said source is pulled adjacent said boom to prevent said source from swinging sideways, first fluid-drive means for driving said first reel means, second fluid-drive means for driving said second reel means, a common fluid supply coupled to said first and second drive means for supplying driving fluid to said first and second drive means to allow said first and second reel means to be driven simultaneously to allow said cable and said fluid conduit to be moved concomitantly in the same direction, said fluid conduit being coupled to said source and to the perimeter of said second reel means, an axle coupled to said second reel means for rotation therewith, at least one stationary member extending axially into said axle, at least one aperture extending axially into said member, conduit means extending from the perimeter of said first reel means to the axle thereof and supported for rotation therewith, said conduit means providing a fluid flow passage from said axle to said fluid conduit, means for supplying fluid to said aperture, and means for coupling said aperture to said conduit means for allowing fluid from said aperture to flow to said conduit means for passage to said fluid conduit for supplying operating fluid to said source.

References Cited

UNITED STATES PATENTS

| | | | |
|---|---|---|---|
| 2,997,689 | 8/1961 | Johnson et al. | 340—3 |
| 2,357,821 | 9/1944 | Harrington et al. | 242—75.53 |
| 3,095,099 | 6/1963 | Costello | 181—.5 |
| 3,369,627 | 2/1968 | Schempf | 181—.5 |
| 3,371,739 | 3/1968 | Pearson | 181—.5 |
| 3,401,660 | 9/1968 | Strange et al. | 340—7 X |

RODNEY D. BENNETT, Jr., Primary Examiner

D. C. KAUFMAN, Assistant Examiner

U.S. Cl. X.R.

212—26, 74; 214—12, 13; 242—75.53; 340—7